_United States Patent_ [19]

Brown et al.

[11] 4,336,328

[45] Jun. 22, 1982

[54] SILVER HALIDE PRECIPITATION PROCESS WITH DELETION OF MATERIALS THROUGH THE REACTION VESSEL

[75] Inventors: Barry M. Brown, Rochester; Malcolm L. Judd, Pittsford; Roger N. Schindler, Fairport, all of N.Y.

[73] Assignee: Eastman Kodak Company, Rochester, N.Y.

[21] Appl. No.: 272,612

[22] Filed: Jun. 11, 1981

[51] Int. Cl.³ .............................................. G03C 1/02
[52] U.S. Cl. .................................. 430/569; 430/642; 210/650; 366/184
[58] Field of Search ................ 430/569, 642; 210/650; 366/184

[56] References Cited

U.S. PATENT DOCUMENTS

| | | | |
|---|---|---|---|
| 3,790,386 | 2/1974 | Posse et al. | 430/642 |
| 3,801,326 | 4/1974 | Claes | 430/569 |
| 3,897,935 | 8/1975 | Forster et al. | 259/4 |
| 4,046,576 | 9/1977 | Terwilliger et al. | 430/569 |
| 4,147,551 | 4/1979 | Finnicum et al. | 430/567 |
| 4,171,224 | 10/1979 | Verhille et al. | 430/569 |

FOREIGN PATENT DOCUMENTS 1302405 1/1973 United Kingdom .

OTHER PUBLICATIONS

_Research Disclosure_, vol. 102, Oct. 1972, Item 10208.
_Research Disclosure_, vol. 131, Mar. 1975, Item 13122.

_Primary Examiner_—J. Travis Brown
_Attorney, Agent, or Firm_—Carl O. Thomas

[57] ABSTRACT

An improved silver halide precipitation process of preparing a dispersion of silver halide grains is disclosed. The process comprises forming a radiation-sensitive silver halide dispersion by reacting silver and halide salts in solution within a dispersing medium to form silver halide grain nuclei within the dispersing medium and allowing silver halide grain growth to occur in a reaction vessel in which the silver halide grain nuclei and the dispersing medium are present. The improvement comprises, during silver halide grain growth, withdrawing a portion of the dispersing medium from the reaction vessel through an ultrafiltration membrane while retaining the silver halide grains within the dispersing medium remaining within the reaction vessel.

16 Claims, 2 Drawing Figures

SILVER HALIDE PRECIPITATION PROCESS WITH DELETION OF MATERIALS THROUGH THE REACTION VESSEL

FIELD OF THE INVENTION

The present invention is drawn to an improvement in processes of preparing dispersions of radiation-sensitive silver halide grains.

DESCRIPTION OF THE STATE OF THE ART

Radiation-sensitive silver halide grains can be prepared by a variety of conventional techniques. One common approach is a batch preparation technique commonly referred to as a single-jet (or single-run) precipitation technique. According to this technique a silver salt solution is run into a reaction vessel containing a halide salt solution. The first silver salt introduced into the reaction vessel reacts with halide salt to form silver halide grain nuclei. Thereafter, as additional silver salt is introduced, additional silver halide is formed as a reaction product. Some of this silver halide forms additional nuclei while the remaining silver halide is concurrently deposited on the existing silver halide grain nuclei. Single-jet precipitation is discussed by T. H. James, *The Theory of the Photographic Process*, 4th Ed., Macmillan, 1977, Chapter 3, and is specifically illustrated by Trivelli and Smith *The Photographic Journal*, Vol. LXXIX, May 1939, pp. 300–338.

Another approach to silver halide preparation is a batch approach commonly referred to as a double-jet (or double-run) precipitation technique. According to this approach a silver salt solution and a halide salt solution are concurrently run into a reaction vessel containing a dispersing medium. Precipitation of silver halide grains preferably occurs in two distinct stages. In a first, nucleation stage, initial silver halide grain formation occurs. This is followed by a second, growth stage in which additional silver halide formed as a reaction product precipitates onto the initially formed silver halide grains, resulting in growth of these silver halide grains. Batch double-jet precipitations are typically undertaken under conditions of rapid stirring of reactants in which the volume within the reaction vessel continuously increases during the silver halide precipitation make or run.

DISCUSSION OF SPECIFIC PRIOR ART

Continuous double-jet precipitation procedures are known, as illustrated by U.K. Pat. No. 1,302,405, Claes U.S. Pat. No. 3,801,326, and Terwilliger et al U.S. Pat. No. 4,046,576, in which the volume of the reaction vessel remains constant during silver halide precipitation under steady-state operating conditions by reason of continuous removal of silver halide dispersion.

Posse et al U.S. Pat. No. 3,790,386 is directed to a variant form of a continuous double-jet precipitation technique in which the silver halide dispersion is continuously withdrawn from a constant volume reaction vessel and fed to a separate ripening vessel which is at least 10 times the volume of the reaction vessel. Posse et al makes no provision for the removal of soluble salts or dispersing medium from the silver halide dispersions produced; hence the total volume of the dispersion in the reaction and ripening vessels increases in direct relation to the salt solutions added. Similar continuous double-jet precipitation arrangements are disclosed by Forster et al U.S. Pat. No. 3,897,935, Finnicum et al U.S. Pat. No. 4,147,551, and Verhille et al U.S. Pat. No. 4,171,224.

The purification and/or concentration of silver halide emulsions by ultrafiltration (also termed diafiltration) is known in the art. Such techniques are illustrated by *Research Disclosure*, Vol. 102, October 1972, Item 10208, and Vol. 131, March 1975, Item 13122. *Research Disclosure* is published by Industrial Opportunities Ltd., Homewell, Havant Hampshire, PO9 1EF, U.K. It is recognized that the soluble salts, such as alkali nitrate, formed as a by-product in precipitating silver halide can be removed by ultrafiltration while continuously adding makeup water to the emulsion. After the soluble salt content has been reduced to the desired level, it is taught to terminate the addition of makeup water and to reduce the liquid volume of the emulsion by ultrafiltration. The liquid volume of the emulsion can also be reduced by ultrafiltration after addenda have been added and before coating.

Advantages of the Invention—In General

The present invention is directed to an improved process for the preparation of radiation-sensitive silver halide dispersions. As compared with conventional precipitation processes, the present process can be employed to (1) avoid any tendency toward continued formation of silver halide grains during the growth stage of silver halide precipitation (i.e., renucleation), (2) reduce unwanted crystal imperfections of silver halide grains, (3) reduce reduction fogging of silver halide grains, and (4) produce silver halide grains of less variability in sensitivity. As compared to conventional batch precipitation processes, less variation in the volume of materials in the reaction vessel occurs. This permits a better match between the reaction vessel capacity and the materials volume. For example, more uniform stirring as a function of both run time and reaction vessel volume can be achieved for a given reaction vessel. Higher stirring rates can be employed. Foaming due to air entrapment within the reaction vessel on startup can be obviated. More dilute solutions can be employed without dilution of the silver halide dispersion produced as a final product. It is preferred to prepare silver halide dispersions according to this process with reduced variation in or, most preferably, constant volumes in the reaction vessels. It is possible to produce by the present process a quantity of silver halide grains that, by conventional procedures, require up to 8 times more reaction vessel capacity. This permits output to be increased with existing reaction vessel capacity or the size and/or number of the reaction vessels to be reduced while retaining existing output levels. In addition the foregoing advantages can be achieved in the practice of the present invention without removing any portion of the silver halide dispersion from the reaction vessel during grain growth for external processing and return.

Advantages of the Invention—Colloid-Free Dispersions

The foregoing discussion of the present process is equally applicable to silver halide dispersions prepared in the presence or absence of peptizers. This invention offers further distinct advantages as applied to the precipitation of silver halide grains in the absence of a peptizer. Peptizers, such as hydrophilic colloids, are commonly employed in the preparation of silver halide dispersions to prevent coalescence or flocculation of the silver halide grains. Although advantageous for this purpose, the presence of hydrophilic colloids is known to place limitations on silver halide grains, such as influencing crystal habit, grain distribution, and the character and distribution of crystal defects (see *The Theory of the Photographic Process*, Macmillan, 2nd ed., pp. 85 and 85 and 4th ed., pp. 29-31). The presence of hydrophilic colloids can also interfere with the incorporation of dopants in the silver halide grains. Techniques are known for preparing silver halide grains in the absence of hydrophilic colloids. French Pat. No. 1,173,517, for example, describes a process for preparing silver halide dispersions in the absence of a hydrophilic colloid; but, to prevent silver halide grain flocculation, it is necessary (a) to use highly dilute aqueous salt solutions, (b) to use a surface active agent when the salt solutions are more concentrated, or (c) to prepare highly ammoniacal silver halide dispersions using more concentrated salt solutions. The invention provides a process which reduces limitations heretofore encountered in silver halide precipitation in the absence of hydrophilic colloids. For example, silver halide grains of larger size can be produced in the absence of a hydrophilic colloid peptizer and without resort to surfactants and/or ammoniacal solutions.

SUMMARY OF THE INVENTION

In one aspect, the present invention is directed to an improved process comprising forming a radiation-sensitive silver halide dispersion by reacting silver and halide salts in solution, wherein the silver and halide salts are reacted to form silver and halide grain nuclei in the presence of a dispersing medium and silver halide grain growth is allowed to proceed in a reaction vessel in which the silver halide grain nuclei and the dispersing medium are present. The improvement comprises, during silver halide grain growth, withdrawing a portion of the dispersing medium from the reaction vessel through an ultrafiltration membrane while retaining the silver halide grains within the dispersion remaining within the reaction vessel.

DESCRIPTION OF PREFERRED EMBODIMENTS

Figure 1:
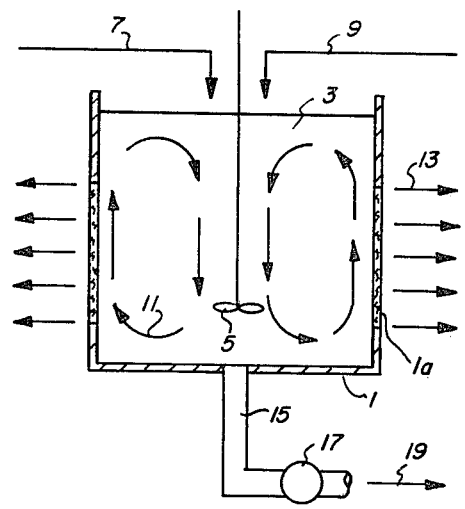
FIG. 1 is a schematic diagram of a precipitation arrangement according to the present invention and FIG. 2 is a schematic diagram of an alternative precipitation arrangement according to the present invention.

In one form the improved precipitation process of the present invention can be practiced as illustrated in FIG. 1. The reaction vessel 1 initially contains a dispersing medium 3. A mechanism 5 for stirring the dispersing medium is schematically illustrated as a propellor attached to a rotatable shaft, although the mechanism can be of any conventional form. With the stirring mechanism in operation, a silver salt solution is run into the reaction vessel through a first jet 7, and a halide salt solution is concurrently run into the reaction vessel through a second jet 9.

The stirring mechanism causes the salt solutions to be substantially instantaneously mixed with the dispersing medium. The halide salt solution contains a soluble halide salt that reacts with a soluble silver salt contained in the silver salt solution to form silver halide as a reaction product. During the initial stage of silver halide formation, referred to as the nucleation stage, a substantially uniform dispersion of silver halide grains is formed. As addition of the silver and halide solutions continues, a transition occurs to a second, growth stage of precipitation in which additional silver halide formed as a reaction product is precipitated onto the initially formed silver halide grains, causing these grains to increase in size. In preparing monodispersed dispersions the formation of additional silver halide grains during the growth stage is minimal, but in forming polydispersed dispersions the formation of additional silver halide grains continues while growth of previously formed silver halide is occurring, resulting in a wide range of silver halide grain sizes.

The volume of materials within the reaction vessel can be controlled by selectively removing a portion of the dispersing medium without removing the silver halide grains. To accomplish this, a portion of the walls of the reaction vessel are formed of an ultrafiltration membrane 1a. As indicated by the arrows 11, the stirring mechanism circulates the silver halide dispersion within the reaction vessel adjacent the inner surface of the ultrafiltration membrane. Circulation of the dispersion can perform a beneficial function in effectively scouring the internal walls of the ultrafiltration membrane, thereby insuring its effectiveness. A portion of the dispersing medium, schematically indicated by arrows 13, penetrates the wall of the reaction vessel through the ultrafiltration membrane. At the same time, the silver halide grains, which are being grown to their desired size, are entirely retained within the reaction vessel. Thus, it is not necessary to remove silver halide dispersing medium for external ultrafiltration and return during the precipitation process. Ultrafiltration is particularly effective during the growth stage of precipitation, but ultrafiltration occurs also during the nucleation stage and can even commence prior to introduction of the silver and halide salts, if desired.

The reaction vessel 1 is shown provided with an outlet conduit 15 controlled by a valve 17 to permit removal of the dispersion from the reaction vessel, as indicated by arrow 19. In a batch process of silver halide precipitation dispersion is removed after the completion of silver halide precipitation—that is, after introduction of silver and halide salts is complete. On the other hand, in continuous silver halide precipitation processes it is known to remove a portion of the dispersion from the reaction vessel while silver and halide salts are being concurrently introduced. In a preferred approach to continuous precipitation the rates of material introductions into the reaction vessel balance the rate of withdrawal of dispersing medium through the ultrafiltration membrane and withdrawal of dispersion through the outlet conduit, so that a steady stage of operation is achieved. By control of the outlet conduit processes intermediate between the extremes of batch precipitation and continuous steady-state precipitation can be performed.

Figure 2:
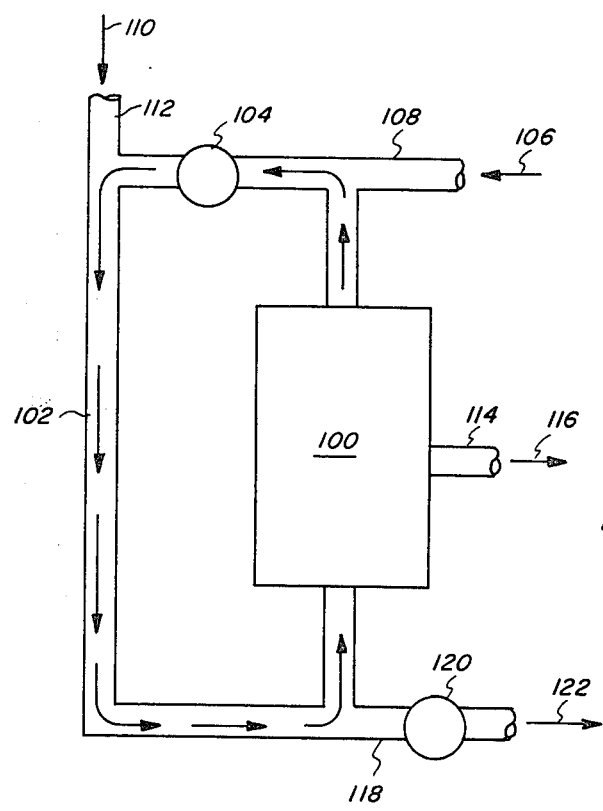

It is recognized that the arrangement shown in FIG. 1 can be varied considerably without departing from the present invention. An alternative arrangement included to illustrate the diversity of the invention is shown in FIG. 2. In FIG. 2 a reaction vessel is formed by an ultrafiltration unit 100, conduit 102 connecting the inlet and outlet of the ultrafiltration unit, thereby forming a circulation loop, and pump 104 which promotes flow within the circulation loop. Halide salt solution, indicated by arrow 106, is introduced into the reaction vessel through a first inlet conduit 108. Similarly silver salt solution, indicated by arrow 110, is introduced into the reaction vessel through a second inlet conduit 112. Dispersing medium is separated from the silver halide dispersion by the ultrafiltration unit and removed through outlet conduit 114, as indicated by arrow 116. The outlet conduit 118 and control valve 120 permit removal of silver halide dispersion, indicated by arrow 122, similarly as described by reference to conduit 15, valve 17, and flow arrow 19 in FIG. 1.

When the silver halide dispersion is a photographic emulsion, a peptizer, such as a hydrophilic colloid, is present in the reaction vessel. The peptizer can be in the dispersing medium within the reaction vessel prior to addition of salt solutions. Alternatively, the peptizer can be added through a third jet, not shown, or through one of the first and second jets, which supply the silver and halide salts, respectively, or the peptizer can be introduced into the reaction vessel using any combination of the above. The peptizer need not be present during the nucleation stage of precipitation, but, when employed, is preferably present during at least a portion of the time ultrafiltration is occurring. In preparing photographic silver halide emulsions a peptizer is typically present during both the nucleation and growth stages of nucleation. Advantageously, ultrafiltration does not remove any substantial proportion of the peptizer, but selectively removes the liquid component of the dispersing medium.

In removing the liquid component of the dispersing medium by ultrafiltration, soluble salts contained in the liquid component are concurrently removed. For example, silver nitrate introduced in the silver salt solution reacts with an alkali or ammonium halide introduced in the halide salt solution to form silver halide as a substantially insoluble reaction product and alkali nitrate as a soluble reaction product. Ultrafiltration removes both liquid dispersing medium and the alkali or ammonium nitrate salt dissolved in the dispersing medium.

The removal of soluble salts by ultrafiltration is particularly important in preparing silver halide dispersions in the absence of a peptizer. It is known that the buildup of soluble salts is one factor which can initiate flocculation of the silver halide grains. Removal of soluble salts by ultrafiltration reduces the risk of silver halide flocculation occurring and permits larger silver halide grains to be formed in the absence of other protective measures to avoid flocculation.

In the preparation of a silver halide dispersion in the absence of a peptizer it is advantageous to reduce further the concentration of soluble salts within the reaction vessel by introducing additional dispersing medium into the reaction vessel. In this instance the additional dispersing medium and ultrafiltration are working together to reduce the concentration of soluble salts within the reaction vessel. The contribution of the additional dispersing medium to the silver halide dispersion volume within the reaction vessel is at least partially offset by ultrafiltration removal of dispersing medium.

The additional dispersing medium can be introduced into the reaction vessel in any convenient manner. For example, it is contemplated to introduce additional dispersing medium through a third jet. In a preferred form the third jet is used to introduce a dilute halide salt solution, preferably a halide salt solution of 0.01 molar or less.

In the absence of a peptizer the concentration within the reaction vessel of the soluble salt formed as a reaction product is less than 0.1 mole per liter, preferably less than 0.05 mole per liter and optimally less than 0.01 mole per liter. In the presence of a peptizer the concentration of the soluble salts can be at any conventional level. For example, maximum soluble salt concentrations of up to 3 moles per liter are contemplated.

Ultrafiltration can be conducted at any stage of silver halide precipitation. Ultrafiltration is preferably conducted during at least a portion of the silver halide grain growth stage of precipitation and is most preferably conducted throughout the growth stage. Although it was originally thought that ultrafiltration should be delayed until after the nucleation of silver halide grain formation, further investigation has revealed that ultrafiltration can be commenced during the nucleation stage of silver halide precipitation or even on start up to commence ultrafiltration flow through the ultrafiltration unit before silver halide precipitation is begun. This is possible for two reasons: (1) ultrafiltration membranes are available exhibiting penetration cutoff values in low molecular weight ranges, as discussed below, and (2) silver halide grain nuclei increase almost instantaneously to about 0.03 micron in size. Typically silver halide grain nuclei emerging from a rotating stirring device toward which silver and halide salts are directed are already at least 0.03 micron in size. Thus, an ultrafiltration membrane of a relatively low cutoff value (often capable of separating particles measured in Angstroms) can readily separate the silver halide nuclei from the soluble salts and the dispersing medium.

Any conventional dispersing medium can be initially present in the reaction vessel. Typically the dispersing medium volume initially present in the reaction vessel is from about 10 to 90 percent, preferably 20 to 80 percent, of that of the silver halide dispersion to be formed. However, since dispersing medium is removed during precipitation, its initial volume can initially equal or even exceed the final volume of the silver halide dispersion. The dispersing medium is preferably water or a dispersion of peptizer in water, optionally containing other ingredients, such as one or more silver halide ripening agents, more specifically described below. Where a peptizer is employed, it is preferably present in a concentration of at least 10 percent, most preferably 20 percent, of the total peptizer present at the completion of the make or run, the balance of the peptizer, if any, being added during addition of the silver and halide salts. A minor portion, typically less than about 10 percent, of one of the silver and halide salt solutions is also initially present in the reaction vessel to adjust the silver ion concentration of the dispersing medium at the outset of silver halide precipitation. Silver ion concentration is routinely measured and referred to by those skilled in the art in terms of pAg (log reciprocal silver ion concentration).

The separate silver and halide salt solutions and techniques for their concurrent introduction into the reaction vessel can take any conventional form known to be useful in double-jet silver halide precipitation processes. *Research Disclosure*, Vol. 176, December 1978, Item 17643, Paragraph I and specific patent teachings, such as Nietz et al U.S. Pat. No. 2,222,264, Illingsworth U.S. Pat. Nos. 3,320,069 and 3,655,394, Irie U.S. Pat. No. 3,650,757, Kurz U.S. Pat. No. 3,672,900, Evans U.S. Pat. No. 3,761,276, Saito U.S. Pat. No. 4,242,445, Wilgus German OLS No. 2,107,118, and Teitscheid et al European Patent Application No. 801028242, illustrate conventional double-jet precipitation techniques useful in the practice of this invention. Specifically preferred double-jet precipitation techniques are those which achieve shortened silver halide precipitation times by employing accelerated rates of addition of silver and halide salt solutions without inducing nucleation in the growth stage. Such techniques are disclosed by Irie, Kurz, Wilgus, and Teitscheid et al, cited above, and here incorporated by reference.

Typically the silver salt solution is an aqueous solution of a soluble silver salt, such as silver nitrate, while the halide salt solution is an aqueous solution of one or more water soluble ammonium, alkali metal (e.g., sodium or potassium) or alkaline earth metal (e.g., magnesium or calcium) halide salts. Useful halides are chlorides, bromides and iodides. Ordinarily iodide accounts for less than 20 mole percent, preferably less than 6 mole percent, of the silver halide, based on total halide. Iodide concentrations as high as about 40 mole percent can be achieved in silver bromoiodides without introducing a separate silver iodide phase. When a plurality of halide salts are employed, they can be introduced separately or in a single jet. Preferably the soluble silver salt and the soluble halide salt are present in aqueous solutions in concentrations of from 0.1 to 2 moles per liter, although salt concentrations up to saturation limits are possible.

Sensitizing compounds can be present during silver halide precipitation. Such compounds can be initially in the reaction vessel or can be added along with one or more of the jets according to conventional procedures. Sensitizing compounds, such as compounds of copper, thallium, lead, bismuth, cadmium, zinc, middle chalcogens (i.e., sulfur, selenium and tellurium), and Group VIII noble metals, can be present during silver halide precipitation, as illustrated by Arnold et al U.S. Pat. No. 1,195,432, Hochstetter U.S. Pat. No. 1,951,933, Trivelli et al U.S. Pat. No. 2,448,060, Overman U.S. Pat. No. 2,628,167, Mueller et al U.S. Pat. No. 2,950,972, Sidebotham U.S. Pat. No. 3,488,709, Rosecrants et al U.S. Pat. No. 3,737,313, Berry et al U.S. Pat. No. 3,772,031, and Atwell U.S. Pat. No. 27,325, filed Apr. 5, 1979.

The individual reactants can be added to the reaction vessel through surface or subsurface delivery tubes by gravity feed or by delivery apparatus for maintaining control of the rate of delivery and the pH and/or pAg of the reaction vessel contents, as illustrated by Culhane et al U.S. Pat. No. 3,821,002, Oliver U.S. Pat. No. 3,031,304 and Claes et al, *Photographische Korrespondenz*, 102 Band, Number 10, 1967, p. 162. In order to obtain rapid distribution of the reactants within the reaction vessel, specially constructed mixing devices can be employed, as illustrated by Audran U.S. Pat. No. 2,996,287, McCrossen et al U.S. Pat. No. 3,342,605, Frame et al U.S. Pat. No. 3,415,650, Porter et al U.S. Pat. No. 3,785,777, Finnicum et al U.S. Pat. No. 4,147,551, Verhille et al U.S. Pat. No. 4,171,224, Calamur U.K. Patent Application No. 2,022,431A, Saito et al German OLS Nos. 2,555,364 and 2,556,885, and *Research Disclosure*, Volume 166, February 1978, Item 16662.

Although the reaction vessel 1 is diagrammatically illustrated as being open, it is specifically contemplated that the reaction vessel can be closed, except as required to permit ingress and egress through the indicated flow paths 7, 9, and 15. Thus the reaction vessel can be entirely filled with liquid throughout preparation of the silver halide dispersion. This offers the distinct advantage of avoiding air (or any other ambient atmosphere) being entrained in the dispersion during its preparation. This in turn permits a much higher rate of stirring of the dispersion by the stirring mechanism 5, if desired, since with an enclosed and filled reaction vessel the risk of forming a vortex and drawing air into the silver halide dispersion (which results in foaming) is obviated.

The silver halide grains produced as a reaction product can include coarse, medium, or fine silver halide grains bounded by 100, 111, or 110 crystal planes and can be prepared by a variety of specific techniques, as illustrated by G. F. Duffin, *Photographic Emulsion Chemistry*, Focal Press, London, 1966, pp. 57-82, and V. L. Zelikman and S. N. Levi, *Making and Coating Photographic Emulsions*, Focal Press, London, 1964, pp. 69-160 and 219-228.

The silver halide grains produced as a reaction product preferably exhibit either relatively broad or a relatively narrow size-frequency distribution. When the silver halide dispersions formed are monodispersed, generally, no more than 5 percent, by weight, of the silver halide grains smaller than the mean size and no more than about 5 percent, by number, of the silver halide grains larger than the mean grain size, vary in diameter from the mean grain diameter by more than about 40 percent. Frequently the definition of monodispersity is stated more succinctly as requiring at least 95 percent, by weight or by number, of the silver halide grains to vary in diameter from the mean grain diameter by less than 40 percent. Definitions of preferred and optimum monodispersity substitute 25 percent and 10 percent, respectively, for the 40 percent reference point appearing in the above definitions. The diameter referred to is the effective diameter; that is, the diameter of a circle corresponding in area to the area subtended by a silver halide grain as viewed through a microscope or in a photomicrograph. The measurement of silver halide grain sizes is discussed further in Mees and James, *The Theory of the Photographic Process*, 3rd ed., Macmillan, 1966, pp. 36-43. Polydispersed silver halide grains—that is, those having a relatively broad size-frequency distribution-can be produced by additional nucleation occurring during the growth stage and by variations in growth rates from grain to grain, as can result from crystal irregularities in the individual silver halide grains. Polydispersed silver halide grains are also obtained when dispersion is withdrawn from the reaction vessel while silver and halide salts are being concurrently introduced, as in steady-state continuous precipitation processes.

Polydispersed radiation-sensitive silver halide grains are commonly favored for photographic applications requiring wide exposure latitude and low contrast while monodispersed radiation-sensitive grains are favored for a variety of photographic applications, including those requiring high contrast, formation of core-shell grains of Ostwald ripening, blending, and uniform fogging or sensitization. Monodispersed radiation-sensitive silver halide grains are particularly advantageous in graphic arts and direct-positive photography. Since monodispersed silver halide grains are more uniform than polydispersed silver halide grains, they can be more optimally and efficiently treated for many photographic applications than polydispersed silver halide grains. Note, for example, Illingsworth U.S. Pat. No. 3,501,305. It is common practice in the art to blend dissimilar monodispersed silver halide dispersions to adjust contrast, latitude, and other photographic properties.

In forming silver halide emulsions peptizer concentrations of from 0.2 to about 10 percent by weight, based on the total weight of emulsion components in the reaction vessel, can be employed; it is preferred to keep the concentration of the peptizer in the reaction vessel prior to and during silver halide formation below about 6 percent by weight, based on the total weight. It is common practice, to maintain the concentration of the peptizer in the reaction vessel in the range of from about 2 to 6 percent, based on the total weight, prior to and during silver halide formation and to adjust the emulsion vehicle concentration upwardly for optimum coating characteristics by delayed, supplemental vehicle additions. It is contemplated that the emulsion as initially formed will contain from about 5 to 50 grams of peptizer per mole of silver halide, preferably about 10 to 30 grams of peptizer per mole of silver halide. Additional vehicle can be added later to bring the concentration up to as high as 300 grams per mole of silver halide. Preferably the concentration of vehicle in the finished emulsion is below 50 grams per mole of silver halide. When coated and dried in forming a photographic element the vehicle preferably forms about 30 to 70 percent by weight of the emulsion layer.

Vehicles (which include both binders and peptizers) can be chosen from among those conventionally employed in silver halide emulsions. Preferred peptizers are hydrophilic colloids, which can be employed alone or in combination with hydrophobic materials. Suitable hydrophilic materials include both naturally occurring substances such as proteins, protein derivatives, cellulose derivatives—e.g., cellulose esters, gelatin—e.g., alkali-treated gelatin (cattle bone or hide gelatin) or acid-treated gelatin (pigskin gelatin), gelatin derivatives—e.g., acetylated gelatin, phthalated gelatin and the like, polysaccharides such as dextran, gum arabic, zein, casein, pectin, collagen derivatives, collodion, agar-agar, arrowroot, albumin and the like as described in Yutzy et al U.S. Pat. Nos. 2,614,928 and '929, Lowe et al U.S. Pat. Nos. 2,691,582, 2,614,930, '931, 2,327,808 and 2,448,534, Gates et al U.S. Pat. Nos. 2,787,545 and 2,956,880, Himmelmann et al U.S. Pat. No. 3,061,436, Farrell et al U.S. Pat. No. 2,816,027, Ryan U.S. Pat. Nos. 3,132,945, 3,138,461 and 3,186,846, Dersch et al U.K. Pat. No. 1,167,159 and U.S. Pat. Nos. 2,960,405 and 3,436,220, Geary U.S. Pat. No. 3,486,896, Gazzard U.K. Pat. No. 793,549, Gates et al U.S. Pat. No. 2,992,213, 3,157,506, 3,184,312 and 3,539,353, Miller et al U.S. Pat. No. 3,227,571, Boyer et al U.S. Pat. No. 3,532,502, Malan U.S. Pat. No. 3,551,151, Lohmer et al U.S. Pat. No. 4,018,609, Luciani et al U.K. Pat. No. 1,186,790, U.K. Pat. No. 1,489,080 and Hori et al Belgian Pat. No. 856,631, U.K. Pat. No. 1,490,644, U.K. Pat. No. 1,483,551, Arase et al U.K. Pat. No. 1,459,906, Salo U.S. Pat. Nos. 2,110,491 and 2,311,086, Fallesen U.S. Pat. No. 2,343,650, Yutzy U.S. Pat. No. 2,322,085, Lowe U.S. Pat. No. 2,563,791, Talbot et al U.S. Pat. No. 2,725,293, Hilborn U.S. Pat. No. 2,748,022, DePauw et al U.S. Pat. No. 2,956,883, Ritchie U.K. Pat. No. 2,095, DeStubner U.S. Pat. No. 1,752,069, Sheppard et al U.S. Pat. No. 2,127,573, Lierg U.S. Pat. No. 2,256,720, Gaspar U.S. Pat. No. 2,361,936, Farmer U.K. Pat. No. 15,727, Stevens U.K. Pat. No. 1,062,116 and Yamamoto et al U.S. Pat. No. 3,923,517.

Other materials commonly employed in combination with hydrophilic colloid peptizers as vehicles (including vehicle extenders—e.g., materials in the form of latices) include synthetic polymeric peptizers, carriers and/or binders such as poly(vinyl lactams), acrylamide polymers, polyvinyl alcohol and its derivatives, polyvinyl acetals, polymers of alkyl and sulfoalkyl acrylates and methacrylates, hydrolyzed polyvinyl acetates, polyamides, polyvinyl pyridine, acrylic acid polymers, maleic anhydride copolymers, polyalkylene oxides, methacrylamide copolymers, polyvinyl oxazolidinones, maleic acid copolymers, vinylamine copolymers, methacrylic acid copolymers, acryloyloxyalkylsulfonic acid copolymers, sulfoalkylacrylamide copolymers, polyalkyleneimine copolymers, polyamines, N,N-dialkylaminoalkyl acrylates, vinyl imidazole copolymers, vinyl sulfide copolymers, halogenated styrene polymers, amineacrylamide polymers, polypeptides and the like as described in Hollister et al U.S. Pat. Nos. 3,679,425, 3,706,564 and 3,813,251, Lowe U.S. Pat. Nos. 2,253,078, 2,276,322, '323, 2,281,703, 2,311,058 and 2,414,207, Lowe et al U.S. Pat. Nos, 2,484,456, 2,541,474 and 2,632,704, Perry et al U.S. Pat. No. 3,425,836, Smith et al U.S. Pat. Nos. 3,415,653 and 3,615,624, Smith U.S. Pat. No. 3,488,708, Whiteley et al U.S. Pat. Nos. 3,392,025 and 3,511,818, Fitzgerald U.S. Pat. Nos. 3,681,079, 3,721,565, 3,852,073, 3,861,918 and 3,925,083, Fitzgerald et al U.S. Pat. No. 3,879,205, Nottorf U.S. Pat. No. 3,142,568, Houck et al U.S. Pat. Nos. 3,062,674 and 3,220,844, Dann et al U.S. Pat. No. 2,882,161, Schupp U.S. Pat. No. 2,579,016, Weaver U.S. Pat. No. 2,829,053, Alles et al U.S. Pat. No. 2,698,240, Priest et al U.S. Pat. No. 3,003,879, Merrill et al U.S. Pat. No. 3,419,397, Stonham U.S. Pat. No. 3,284,207, Lohmer et al U.S. Pat. No. 3,167,430, Williams U.S. Pat. No. 2,957,767, Dawson et al U.S. Pat. No. 2,893,867, Smith et al U.S. Pat. Nos. 2,860,986 and 2,904,539, Ponticello et al U.S. Pat. Nos. 3,929,482 and 3,860,428, Ponticello U.S. Pat. No. 3,939,130, Dykstra U.S. Pat. No. 3,411,911 and Dykstra et al Canadian Pat. No. 774,054, Ream et al U.S. Pat. No. 3,278,289, Smith U.K. Pat. No. 1,466,600, Stevens U.K. Pat. No. 1,062,116, Fordyce U.S. Pat. No. 2,211,323, Martinez U.S. Pat. No. 2,284,877, Watkins U.S. Pat. No. 2,420,455, Jones U.S. Pat. No. 2,533,166, Bolton U.S. Pat. No. 2,495,918, Graves U.S. Pat. No. 2,289,775, Yackel U.S. Pat. No. 2,565,418, Unruh et al U.S. Pat. Nos. 2,865,893 and 2,875,059, Rees et al U.S. Pat. No. 3,536,491, Broadhead et al U.K. Pat. No. 1,348,815, Taylor et al U.S. Pat. No. 3,479,186, Merrill et al U.S. Pat. No. 3,520,857, Bacon et al U.S. Pat. No. 3,690,888, Bowman, U.S. Pat. No. 3,748,143, Dickinson et al U.K. Pat. Nos. 808,227 and '228, Wood U.K. Pat. No. 822,192 and Iguchi et al U.K. Pat. No. 1,398,055. These additional materials need not be present in the reaction vessel during silver halide precipitation, but rather are conventionally added to the emulsion prior to coating. The vehicle materials, including particularly the hydrophilic colloids, as well as the hydrophobic materials useful in combination therewith can be employed not only in the emulsion layers of the photographic elements of this invention, but also in other layers, such as overcoat layers, interlayers and layers positioned beneath the emulsion layers.

Although not required for the practice of this process, it is preferred that silver halide grain ripening occur within the reaction vessel during silver halide formation. Known silver halide solvents are useful in promoting ripening. For example, both ammonia and a stoichiometric excess of halide ions, when present in the reaction vessel, are known to promote silver halide ripening. It is therefore apparent that the halide salt solution run into the reaction vessel can themselves promote ripening. Other ripening agents can also be employed and can be entirely contained within the dispersing medium in the reaction vessel before silver and halide salt addition, or they can be introduced into the reaction vessel along with one or more of the halide salt, silver salt, or peptizer. In still another variant the ripening agent can be introduced independently during halide and silver salt additions.

Among preferred ripening agents are those containing sulfur. Conventional thioether ripening agents, such as those disclosed in McBride U.S. Pat. No. 3,271,157, Jones U.S. Pat. No. 3,574,628, and Rosecrants et al U.S. Pat. No. 34,737,313, here incorporated by reference, can be employed. Sufficient thioether ripening agent is employed to provide concentrations of from 0.05 to 50 grams, preferably about 0.1 to 20 grams, per mole of silver halide, based on the weight of silver.

Certain of the preferred organic thioether silver halide solvents can be represented by the formulas:

$$Q-[(CH_2)_r-CH_2-S-(CH_2)_2-X-(R)_p-$$
$$(CH_2)_2-(R')_q-S-CH_2(CH_2)_m-Z]_n$$

and $$Q-(CH_2)_m-(CH_2-S-(CH_2)_n-S-CH_2-$$
$$(CH_2)_r-Z$$

wherein: r and m are integers of 0 to 4; n is an integer of 1 to 4; p and q are integers of 0 to 3; X is an oxygen atom (—O—), a sulfur atom (—S—), a carbamyl radical

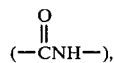
(—CNH—), a carbonyl radical

(—C—)

or a carboxy radical

(—COH);

R and R' are ethylene oxide radicals (—O—CH$_2$CH$_2$—); Q and Z are hydroxy radicals (—OH), carboxy radicals, or alkoxy radicals (—O—alkyl) wherein the alkyl group has 1 to 5 carbon atoms; and Q and Z can also be substituents described for X linked to form a cyclic compound.

Preferred organic thioether silver halide ripening agents suitable for forming the emulsions of the invention include compounds represented by the formulas:

$$HO(-R^2-S-)_rR^2OH,$$

$$(HO-R^2-S-R^2-O-R^4)_2,$$

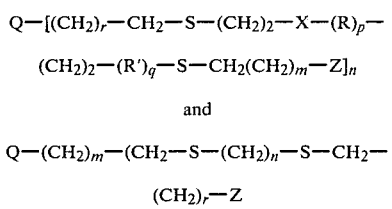

$$(R^3-O-R^2-S-R^2-)_2S,$$

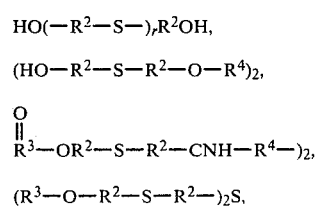

wherein: r is an integer of 1 to 3; s is an integer of 1 to 2; $R^2$ is an alkylene radical having 1 to 5 carbon atoms and is preferably ethylene (—CH$_2$—CH$_2$—); $R^3$ is an alkyl radical having 1 to 5 carbon atoms and is preferably ethyl; and $R^4$ is an alkylene radical having 1 to 5 carbon atoms and is preferably methylene (—CH$_2$—).

As an alternative to thioether ripening agents, thiocyanate salts can be used, such as alkali metal, most commonly potassium, and ammonium thiocyanate salts. While any conventional quantity of the thiocyanate salts can be introduced, preferred concentrations are generally from about 0.1 to 20 grams of thiocyanate salt per mole of silver halide, based on the weight of silver. Illustrative prior teachings of employing thiocyanate ripening agents are found in Nietz et al, U.S. Pat. No. 2,222,264, cited above; Lowe et al U.S. Pat. No. 2,448,534 and Illingsworth U.S. Pat. No. 3,320,069; the disclosures of which are here incorporated by reference.

A variety of ultrafiltration techniques are known. The ultrafiltration unit 100 illustrated can be of any convenient conventional construction. For example, useful ultrafiltration units and their use are illustrated by *Research Disclosure*, Vol. 102, October 1972, Item 10208, Hagemaier et al *Research Disclosure*, Vol. 131, March 1975, Item 13122, Bonnet *Research Disclosure*, Vol. 135, July 1975, Item 13577, Berg et al German OLS No. 2,436,461 and Bolton U.S. Pat. No. 2,495,918.

Ultrafiltration is preferably accomplished by circulating dispersion within the reaction vessel into contact with a semipermeable ultrafiltration membrane of the so that a pressure difference is established across the membrane. The membranes contain pores sized to permit penetration by molecules below a particular size while retaining larger molecules and silver halide grains in the dispersion. Suitable membranes can be selected from among those exhibiting penetration cutoff in the molecular weight range of from about 500 to 300,000 or more, preferably from about 500 to 50,000. Generally the choice of a specific penetration cutoff is a function of the silver halide grain size at the outset of ultrafiltration and the lowest molecular weight material sought to be retained in the dispersion remaining (or retentate) afteer separation of dispersing medium and/or soluble salts. It is fortunate that the molecular weight of the soluble reaction product of halide and salt solutions (e.g., alkali nitrate) is low, thereby facilitating selection of a penetration cutoff which allows selective retention of the silver halide grains and peptizer, if any, present in the dispersion.

The pressure of the dispersion contacting the ultrafiltration membrane can vary over a wide range. Typically the pressure within the reaction vessel contacting the ultrafiltration membrane is about 100 psig while the outlet pressure of the retentate is up to about 10 psig. The pressure differential across the membrane is typically in the range of from about 40 to 60 psi. It is, of course, within the skill of the art to operate at pressures outside of these ranges, depending upon the construction of the reaction vessel and ultrafiltration membrane, the viscosity of the dispersion, the concentration of the retentate, and the purity of the retentate desired.

The membranes employed in ultrafiltration are typically anisotropic membranes which comprise a very thin layer of extremely fine pore texture supported upon a thicker porous structure. Useful membranes can be formed of a variety of polymeric materials, such as poly(vinyl chloride), poly(vinyl carboxylate)—e.g., poly(vinyl formate) and poly(vinyl acetate), poly(vinyl alcohol), polysulfones, poly(vinyl ether), polyacrylamides and polymethacrylamides, polyimides, polyesters, polyfluoroalkylenes—e.g., polytetrafluoroethylene and polyvinylidene fluoride, and cellulosic polymers, such as, cellulose and cellulose esters—e.g., cellulose acetate, cellulose butyrate and cellulose acetate butyrate.

Although the process has been described in FIG. 2 by reference to a simple loop containing a single ultrafiltration unit, it is appreciated that the loop can be altered without departing from the invention. For example, instead of employing a single ultrafiltration unit, two or more ultrafiltration units can be used in series. Further, two or more parallel loops can be employed. Composite loops can also be employed. For example, where the ultrafiltration unit 100 has a relatively high cutoff, the withdrawn dispersing medium comprising the flow path 116 can be fed to a second ultrafiltration unit having a substantially lower cutoff. The retentate from the second ultrafiltration unit can then be returned to the reaction vessel. In another variant form a portion of the liquid removed through the conduit 114 can be fed directly back into the reaction vessel with a remaining portion being disposed of as waste.

The proportion of dispersing medium removed by ultrafiltration can be controlled to any desired level by routine adjustment of the liquid flow rate within the reaction vessel and/or the pressure differential across the ultrafiltration membrane. In fact, it is possible to prevent ultrafiltration from occurring during any phase of precipitation merely by reducing the pressure differential across the ultrafiltration membrane. Mechanical dampening of ultrafiltration rates are also possible. The volume of the silver halide dispersion at the completion of concurrent silver and halide salt additions as a percentage of the total volume of materials introduced can be varied widely, depending upon the silver halide dispersion characteristics desired. In those instances in which silver halide dispersions are being formed in the absence of a peptizer and with dilute halide salt washing the proportion of dispersing medium removed can be quite high. Typically the proportion of dispersing medium (including dissolved salts) removed is from about 10 to 90 percent of the total volume of materials introduced. It is generally preferred that the proportion of dispersing medium removed be at least 50 percent of the total materials introduced.

In the course of preparing silver halide dispersions according to this process, particularly in the absence of a peptizer, a very high proportion of the dispersing medium can be introduced through the third jet. In one preferred form the third jet introduces the dilute aqueous halide salt solution described above at a flow rate of from 10 to 30 times the combined flow rates of the silver and halide salt solutions of the first and second jets. In such instances the third jet and the ultrafiltration membrane are working together to reduce markedly the soluble salt concentration of the silver halide dispersion. The large excesses of dispersing medium introduced by the third jet can be easily removed by ultrafiltration and can be distinctly advantageous in providing optimum flow levels within the ultrafiltration unit chosen for use.

It is specifically contemplated to continue introduction through the third jet and ultrafiltration after flow through the first and second jets has been terminated. It is further contemplated to alternate periods in which the first and second jets and/or the third jet are open with periods in which only the third jet is open. Thus, the third jet and ultrafiltration can together reduce soluble salt concentrations during silver halide formation, during interruptions in silver halide formation and/or after silver halide formation.

As the size of the silver halide grains increases in the absence of a peptizer, the risk of flocculation increases, and lowering the soluble salt concentration becomes increasingly important. The flow rate through the third jet can be progressively increased as the run progresses. It is also possible to interrupt silver and halide salt solution introductions through the first and second jets at more frequent intervals as the run progresses.

The addition of silver and halide salt solutions is terminated after they have been introduced in an amount sufficient to produce silver halide grains of the desired size. One of the salts can be added thereafter to adjust the pAg of the silver halide dispersion, if desired, although this is not necessary. Ultrafiltration can be terminated along with concurrent silver and halide salt additions, or it can be continued to remove additional soluble salts and dispersing medium, even when a third jet is not employed or it is closed. When all additions and ultrafiltration are terminated, the silver halide dispersion is removed from the reaction vessel for subsequent processing in any conventional manner. For example, the silver halide dispersion can be removed from the reaction vessel and washed by conventional techniques, as illustrated by *Research Disclosure*, Item 17643, cited above, Paragraph II Emulsion Washing.

In the simplest form of the invention the nucleation and growth stages of silver halide precipitation occur in the same reaction vessel during the course of a single batch double-jet precipitation run. It is, however, recognized that silver halide precipitation can be interrupted, particularly after completion of the growth stage. Further, two or more separate reaction vessels can be substituted for the single reaction vessel described above. The nucleation stage of silver halide preparation can be performed in an upstream reaction vessel (herein also termed a nucleation vessel) and the dispersed silver halide grain nuclei can be transferred to a downstream reaction vessel in which the growth stage of silver halide precipitation occurs (herein also termed a growth reaction vessel). In one arrangement of this type an enclosed nucleation vessel can be employed to receive and mix reactants upstream of the growth reaction vessel, as illustrated by Posse et al, Forster et al, Finnicum et al, and Verhille et al, cited above. In these arrangements the contents of the growth reaction vessel are recirculated to the nucleation reaction vessel.

It is herein contemplated that various parameters important to the control of silver halide grain formation and growth, such as pH, pAg, ripening, temperature, and residence time, can be independently controlled in separate reaction vessels. To allow silver halide nucleation to be entirely independent of silver halide grain growth occurring in the growth reaction vessel downstream of the nucleation vessel, no portion of the silver halide dispersion present in the growth reaction vessel should be recirculated to the nucleation vessel. Since the nucleation stage of silver halide precipitation can thus be independent of the growth stage, it is apparent that the nucleation stage of silver halide precipitation can be performed by conventional silver halide precipitation processes in addition to batch double-jet processes, such as single jet and continuous double-jet precipitation processes, such as those illustrated by James, Trivelli and Smith, Claes, and Terwilliger et al, cited above. Cascaded continuous precipitation processes, as suggested by Terwilliger et al and Zelikman and Levy, *Making and Coating Photographic Emulsions,* Focal Press, N.Y., 1964, p. 228, can be achieved by connecting two or more units as shown in FIGS. 1 and 2 in series.

Silver salt solution can be independently run into the nucleation vessel only or into both the nucleation and growth reaction vessels. Halide salt solutions can be initially present in and/or run into the nucleation vessel. Since soluble halide salts are removed by ultrafiltration and since it is usually desirable for silver halide grain growth to occur in the presence of a stoichiometric excess of halide ions, in most instances soluble halide salts will be added to the growth reaction vessel, either from the nucleation vessel or independently. Third jets, described above for use either for delivering peptizer or diluting the soluble salts, can be directed into the nucleating vessel, the growth reaction vessel, or both. When a third jet is employed for diluting the soluble salts formed by reaction, it is preferred that the third jet be directed into the growth reaction vessel. Other variant arrangements are, of course, possible.

It is specifically contemplated to blend the silver halide dispersion with other silver halide dispersions prepared by the process of this invention or other conventional procedures, although this is not required. Blending can occur immediately following the silver halide precipitation run or at any subsequent stage prior to coating.

The silver halide dispersions can be further prepared for use by conventional procedures of the type disclosed in *Research Disclosure,* Item 17643, cited above. They can be chemically sensitized as described in Paragraph III Chemical sensitization. They can be spectrally sensitized or desensitized as described by Paragraph IV Spectral sensitization and desensitization. Other conventional photographic addenda can be added to the silver halide dispersions, such as described by Paragraph V Brighteners and Paragraph VI Antifoggants and stabilizers. The addenda can be added to the silver halide dispersions by conventional techniques, such as described by Paragraph XIV Methods of addition. It is also contemplated to place the addenda, particularly the spectral sensitizing dyes, in the reaction vessel prior to silver halide precipitation or to run these materials into the reaction vessel during silver halide precipitation, preferably during the growth stage. Teachings of such techniques are contained in Hill U.S. Pat. No. 3,628,960, Locker et al U.S. Ser. No. 881,230, filed Feb. 27, 1978, and Locker U.S. Ser. No. 944,666, filed Sept. 22, 1978. It is specifically recognized that the addition of vehicle can be delayed until after addenda have been added to the silver halide dispersions, since the addenda can be more effective when added in the absence of a vehicle. Hardeners, as disclosed in Paragraph X Hardeners, are employed in combination with the vehicles.

The silver halide dispersions can be employed to form silver halide photographic elements of any desired conventional form. Exemplary conventional photographic elements and features thereof are disclosed in *Research Disclosure,* Item 17643, cited above, Paragraphs VII Color materials, VIII Absorbing and scattering materials, XI Coating aids, XII Plasticizers and lubricants, XVI Matting agents, XVII Supports, XX Developing agents, XXI Development modifiers, XXII Physical development systems, XXIII Image transfer systems, XXIV Dry development systems, XXV Printing and lithography, XXVI Printout and XXVII Direct-print. The silver halide dispersions and other layers of the photographic elements can be coated by the procedures set out in Paragraph XV Coating and drying procedures. The photographic elements can be exposed and processed by conventional procedures, such as those of Paragraphs XVIII Exposure and XIX Processing.

The invention has been described with particular reference to preferred embodiments thereof but it will be understood that variations and modifications can be effected within the spirit and scope of the invention.

What is claimed is:

1. In a process comprising
forming a radiation-sensitive silver halide dispersion by reacting silver and halide salts in solution, wherein the silver and halide salts are reacted to form silver halide grain nuclei in the presence of a dispersing medium and silver halide grain growth is allowed to proceed in a reaction vessel in which the silver halide grain nuclei and the dispersing medium are present, the improvement comprising, during silver halide grain growth, withdrawing a portion of the dispersing medium from the reaction vessel through an ultrafiltration membrane while retaining the silver halide grains within the dispersing medium remaining within the reaction vessel.

2. An improved process according to claim 1 in which the dispersing medium contains a peptizer during silver halide grain growth.

3. An improved process according to claim 1 in which the dispersing medium contains a hydrophilic colloid.

4. An improved process according to claim 1 in which the silver halide grains remain within the reaction vessel throughout the introduction of silver and halide salts.

5. An improved process according to claim 1 in which the silver halide grains are monodispersed.

6. An improved process according to claim 1 in which a portion of the silver halide dispersion is removed from the reaction vessel while silver and halide salts are being introduced.

7. An improved process according to claim 6 in which the silver halide grains are polydispersed.

8. An improved process according to claim 1 in which the reaction vessel is a closed vessel.

9. An improved process according to claim 1 in which at least one of the silver and halide salts introduced into the reaction vessel is silver halide.

10. In a double-jet precipitation process of preparing a silver halide emulsion comprising
concurrently introducing silver and halide salts through separate jets into reactive contact to form silver halide grain nuclei followed by silver halide grain growth in a reaction vessel in the presence of an aqueous dispersing medium containing gelatin or a gelatin derivative acting as a peptizer, the improvement comprising, during silver halide grain growth, withdrawing water from the reaction vessel through an ultrafiltration membrane while retaining the silver halide grains within the dispersing medium remaining within the reaction vessel.

11. An improved process according to claim 10 in which the silver and halide are brought into reactive contact in a separate nucleation reaction vessel prior to introduction into the reaction vessel in which ultrafiltration occurs.

12. An improved process according to claim 10 in which the silver halide emulsion is circulated through an ultrafiltration unit forming a portion of the reaction vessel during silver halide grain growth.

13. An improved process according to claim 12 in which a portion of the silver halide emulsion is withdrawn from the reaction vessel while circulation is occurring.

14. An improved process according to claim 10 in which the reaction vessel is an open batch vessel having a portion of its side wall formed by the ultrafiltration membrane and the silver halide emulsion is circulated within the open batch reaction vessel.

15. An improved process according to claim 10 in which silver halide grain growth occurs in a plurality of reaction vessels connected to permit the flow of silver halide emulsion therebetween, at least one of the reaction vessels having a wall thereof comprised of an ultrafiltration membrane.

16. An improved process according to claim 15 in which a plurality of the reaction vessels have walls comprised of an ultrafiltration membrane, so that ultrafiltration occurs from a plurality of reaction vessels.

* * * * *